United States Patent [19]

Suzuki et al.

[11] Patent Number: 4,643,681

[45] Date of Patent: Feb. 17, 1987

[54] PLANETARIUM HAVING AN AUXILIARY PROJECTOR INDEPENDENTLY ROTATABLE ABOUT A STAR FIELD PROJECTOR

[75] Inventors: Takao Suzuki, Toyokawa; Kenji Shiba, Toyohashi, both of Japan

[73] Assignee: Minolta Camera K.K., Osaka, Japan

[21] Appl. No.: 726,198

[22] Filed: Apr. 22, 1985

[30] Foreign Application Priority Data

Apr. 24, 1984 [JP] Japan ................................ 59-83314

[51] Int. Cl.⁴ .............................................. G09B 27/00
[52] U.S. Cl. .................................................. 434/286
[58] Field of Search ............................... 434/286, 285

[56] References Cited

U.S. PATENT DOCUMENTS 3,074,183 1/1963 Frank ................................ 434/286
3,571,954 3/1971 Frank ................................ 434/286
4,020,568 5/1977 Tajima et al. ...................... 434/286

Primary Examiner—William H. Grieb
Attorney, Agent, or Firm—Wolder, Gross & Yavner

[57] ABSTRACT

A planetarium comprises a star field projector which projects the star field, a ring-shaped member which supports the star field projector rotatably about a first axis, a first rotating member which supports the ring-shaped member rotatably about a second axis orthogonally crossing the first axis, a support base which supports the first rotating member rotatably about a third axis orthogonally crossing the second axis, a second rotating member provided on the support base rotatable about the third axis independent of the first rotating member, and a coordinates projector provided on the second rotating member.

11 Claims, 7 Drawing Figures

PLANETARIUM HAVING AN AUXILIARY PROJECTOR INDEPENDENTLY ROTATABLE ABOUT A STAR FIELD PROJECTOR

BACKGROUND OF THE INVENTION

The present invention relates to a planetarium comprising a coordinates projector and more specifically to a planetarium for projecting directions such as north, south, east and west, and the reference coordinates such as bearings, meridian and poles.

A planetarium of the prior art mainly projects the celestial bodies observed from the earth by a star-field projector which is rotatable about its rotary axes, and it also projects coordinates by coordinates projectors. These coordinates projectors are provided on a rotating member which is secured to the star-field projector whereby the coordinates projectors are moved with the star-field projector for projection of the coordinates.

However, recently, diverse motions of a celestial body can be explained through the development of a technology for the projection of the images of celestial bodies as observed from the planets such as the Sun, the Moon, or from Mercury or Venus.

However, the image projection of a celestial body as it travels around a planet other than the earth, as mentioned above, is accompanied by the disadvantages that the coordinates projectors cannot project the reference coordinates such as the bearings on respective planets because of the coordinates projectors being moved with the star-field projector and it is visually difficult to understand the meaning of the motion of a celestial body even in the case where the diurnal motion or change of latitude are simulated on planets other than earth.

SUMMARY OF THE INVENTION

It is an essential object of the present invention to provide a planetarium comprising a coordinates projector for assisting the visual understanding of the meaning of the motion of a celestial body projected.

It is another object of the present invention to provide a planetarium comprising a coordinates projector for assisting in the understanding of the motions of a celestial body by projecting the corresponding reference coordinates, not only in the case where the celestial body as observed from the earth is projected, but also in the case where the celestial body as observed from locations other than the earth, such as the Sun or the Moon are projected.

In accomplishing these and other objects, the planetarium of the present invention comprises a star-field projecting globe projecting a star field, a supporting means for supporting said star field projecting globe rotatably about a first axis, a first rotating means for supporting said supporting means rotatably about a second axis which is orthogonal to said first axis, auxiliary projecting means for projecting coordinates, a second rotating means for supporting said auxiliary projecting means, and a base means for supporting said first rotating means and said second rotating means for independent rotation thereof about a third axis which is orthogonal to said second axis.

By the arrangement according to the present invention as described above, an improved planetarium of simple construction has been provided.

BRIEF DESCRIPTION OF THE DRAWINGS

These and other objects and features of the present invention will become apparent from the following description taken in conjuention with the preferred embodiment thereof with reference to the accompanying drawings, in which.

DETAILED DESCRIPTION OF THE INVENTION

Figure 1:
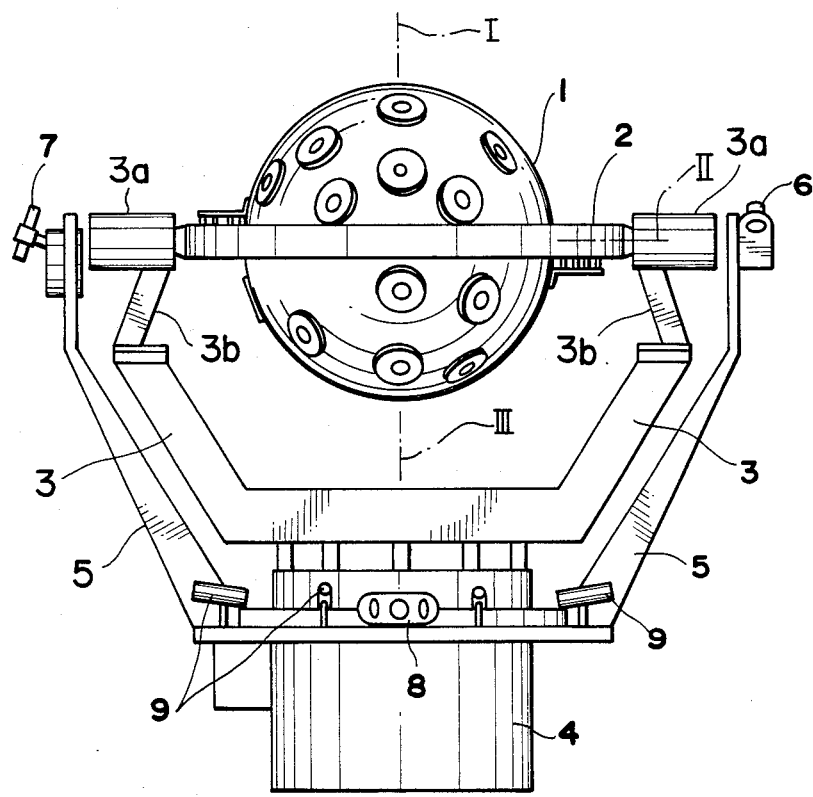
FIG. 1 is a side view of a planetarium embodying the present invention.

Before the description of the present invention proceeds, it is noted that like parts are designated by like reference numerals throughout the accompanying drawings.

In FIG. 1, which illustrates general construction of the planetarium of the present invention, a ball type star field projector (1) which projects fixed stars in the North and South celestial spheres is provided on a ring-shaped member (2), and is supported by ring-shaped member (2) for rotation about a first axis (I) for simulating the diurnal motions of planets. For simulating changes in latitude of planets, ring-shaped member (2) is supported by a pair of holding portions (3a) for rotation about a second axis (II) which in the horizontal direction orthogonally crosses first axis (I), holding portions (3a) being secured to a pair of first rotating members (3) through fitting arms (3b). For simulating the change of latitude and diurnal motions of planets by cooperation with the rotation about said first and second axes (I) and (II), first rotating member (3) is supported on a fixed base (4) for rotation about a third axis (III) which orthogonally crosses the second axis (II).

A pair of second rotating members (5) which are rotatable about said third axis (III) are provided at the external circumference of base (4). The second rotating members (5) are provided with four kinds of reference coordinates projectors, namely, a meridian projector (6), a pole projector (7), a pair of bearing projectors (8) which projects the bearings, and eight direction projectors (9) which indicate the directions of North, South, East and West in accordance with an inversion of the North and South celestial spheres.

Figure 2:
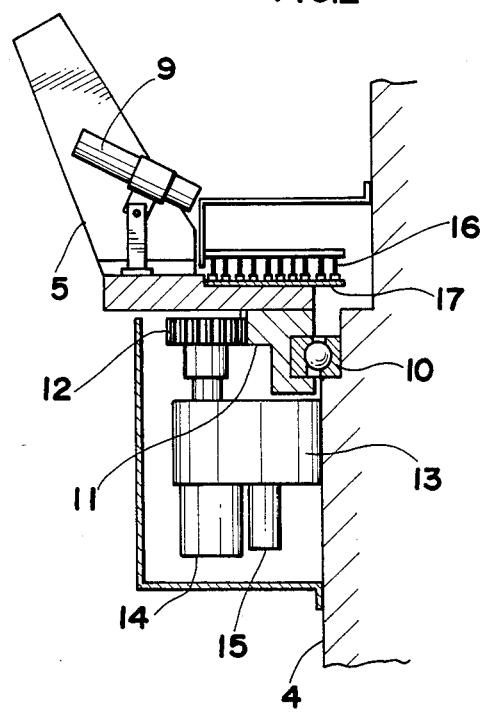
FIG. 2 is a cross section indicating the mechanism for effecting the rotation of the second rotating member.

As shown in FIG. 2, second rotating member (5) is rotatably mounted through a bearing (10) on base (4), and is rotatable about third axis (III) by way of gear (11) at the lower external circumference of the second rotating member (5) by an electric motor (14) coupled to a gear (12) engaging the gear (11) through a reduction gear (13). In the same figure, (15) designates an encoder which detects the amount of rotation of the second rotating member (5). A brush (16) attached to the side of fixing base (4) is slidingly in contact with a slip ring (17) provided on the second rotating member (5), and the brush (16) with the slipring (17) supply power to projectors (6), (7), (8) and (9).

Figure 3:
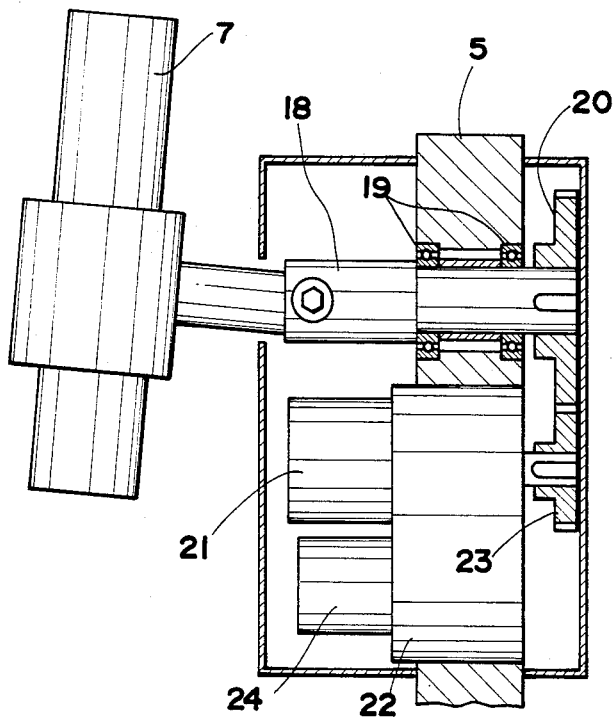
FIG. 3 is a cross section indicating the mechanism for rotating the coordinates projector.

Pole projectors (7) is coupled to a rotating shaft (18) as shown in FIG. 3, and rotating shaft (18) is mounted by way of a bearing (19) to the upper end of the second rotating member (5) for rotation about the horizontal axis. The rotating shaft (18) is provided with a gear (20) which engages a driving gear (23) which is driven by an electric motor (21) through a reduction gear (22) so that the pole projector (7) is rotatingly driven to the upper and lower directions. An encoder 24 detects the amount of rotation of the pole projector (7). The pole projector (7) rotates only within the limited range of about ⅓ rotation and therefore it does not require a sliding conductive device.

The electrical power supplied from fixing base (4) to the first rotating member (3) is fed in turn to the ring-shaped member (2), from and to the projector (1) through the brush and the slip ring. Simultaneously, the rotation of the first rotating member (3) relative to the fixing base (4), the rotation of the ring-shaped member (2) relative to the first rotating member (3) as well as the rotation of projector (1) on the ring-shaped member (2) are respectively effected by the use of an electric motor having a stator and a rotor.

Figure 4:
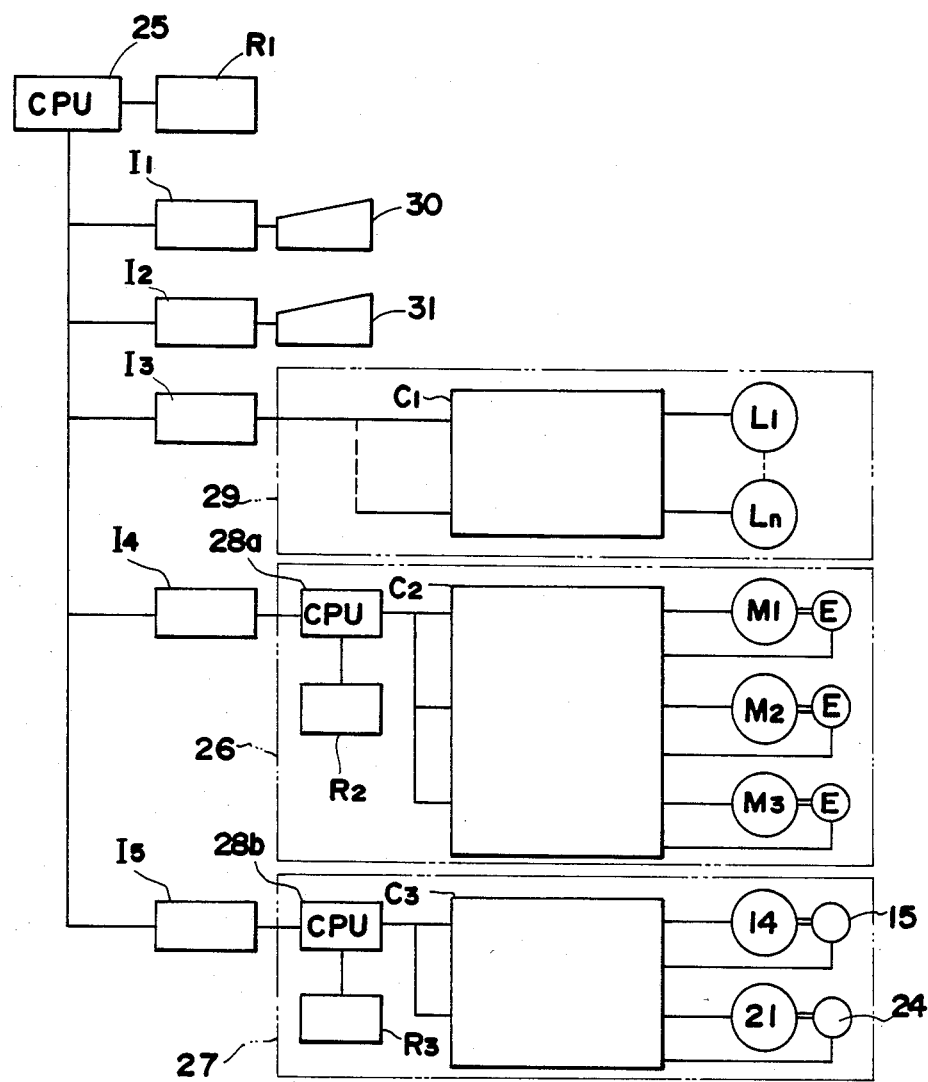
FIG. 4 is a schematic circuit diagram indicating a driving control circuit of the planetarium.

As shown in FIG. 4, the control circuit incorporated in the planetarium includes input and output units connected to host CPU (25) for controlling the planetarium through a memory ($R_1$) and interfaces ($I_1$) to ($I_5$). More specifically, a console (30) which is provided with switches for controlling the drive of the planetarium is connected to the interface ($I_1$), while a keyboard (31) which is used to input various data for projection is connected to the interface ($I_2$). A lamp control part (29) including a lamp control circuit ($C_1$) is connected to the interface ($I_3$) in order to control the lighting of lamps ($L_1$) to ($L_n$) of various kinds of projectors. Meanwhile, a fixed star driving part (26) which controls the combined motions of three axes of star field project (1) is connected to the interface ($I_4$). The fixed star driving part (26) includes a guest CPU (28a), memory ($R_2$), a motor control circuit ($C_2$) for controlling the drive of the motors ($M_1$) to ($M_3$) which drive the respective rotating axes, and encoders ($E_1$) to ($E_3$) provided for each axis for detecting the amount of rotation of respective rotating axes. Moreover, a driving part (27) for controlling the reference coordinates projector is connected to the interface ($I_5$). The driving part (27) includes a guest CPU (28b), a memory ($R_3$), a motor control circuit ($C_3$) for controlling an electric motor (14) which drives the second rotating member (5) and an electric motor (21) which drives the pole projector (7), the encoder (15) which detects amount of rotation of the second rotating member (5) and the encoder (24) which detects amount of rotation of the pole projector (7).

Figure 5A:
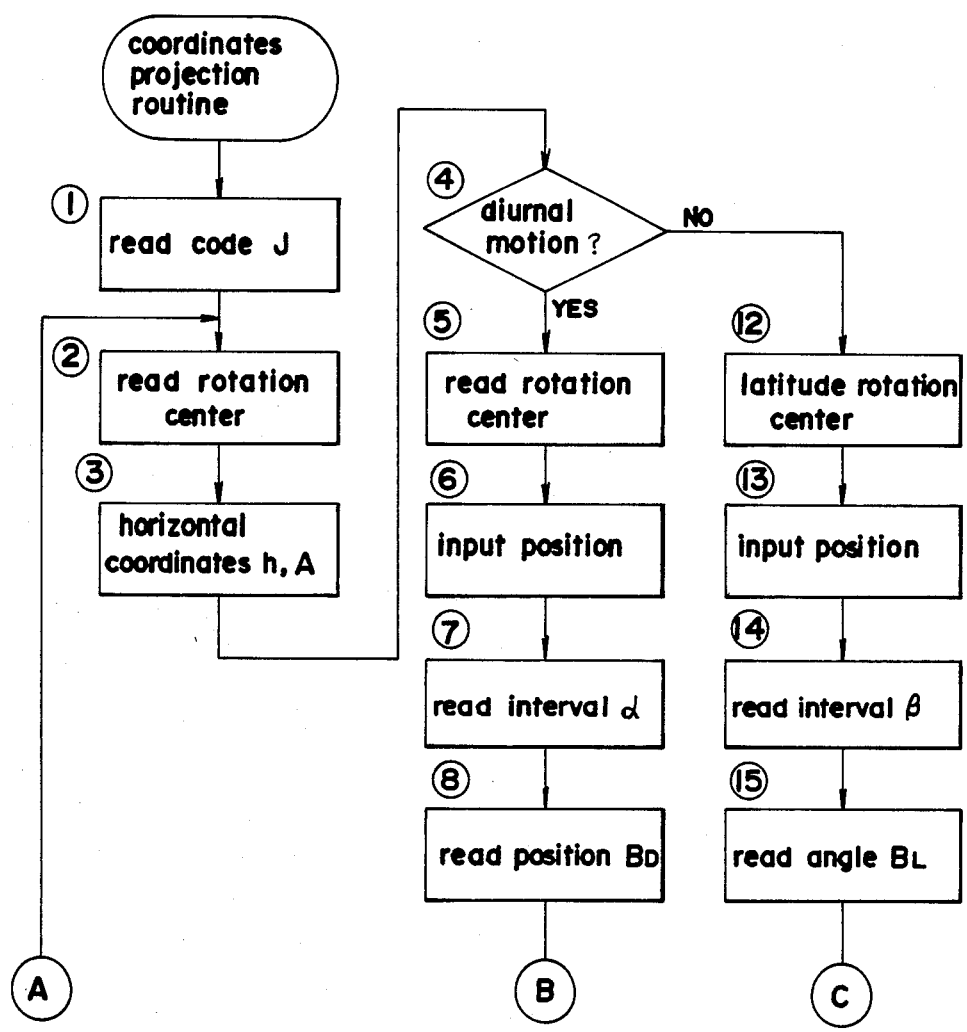
FIGS. 5 and 5b are a flow chart indicating the procedures for driving and controlling the planetarium, and FIG. 6 indicates the coordinates axes.
Figure 5B:
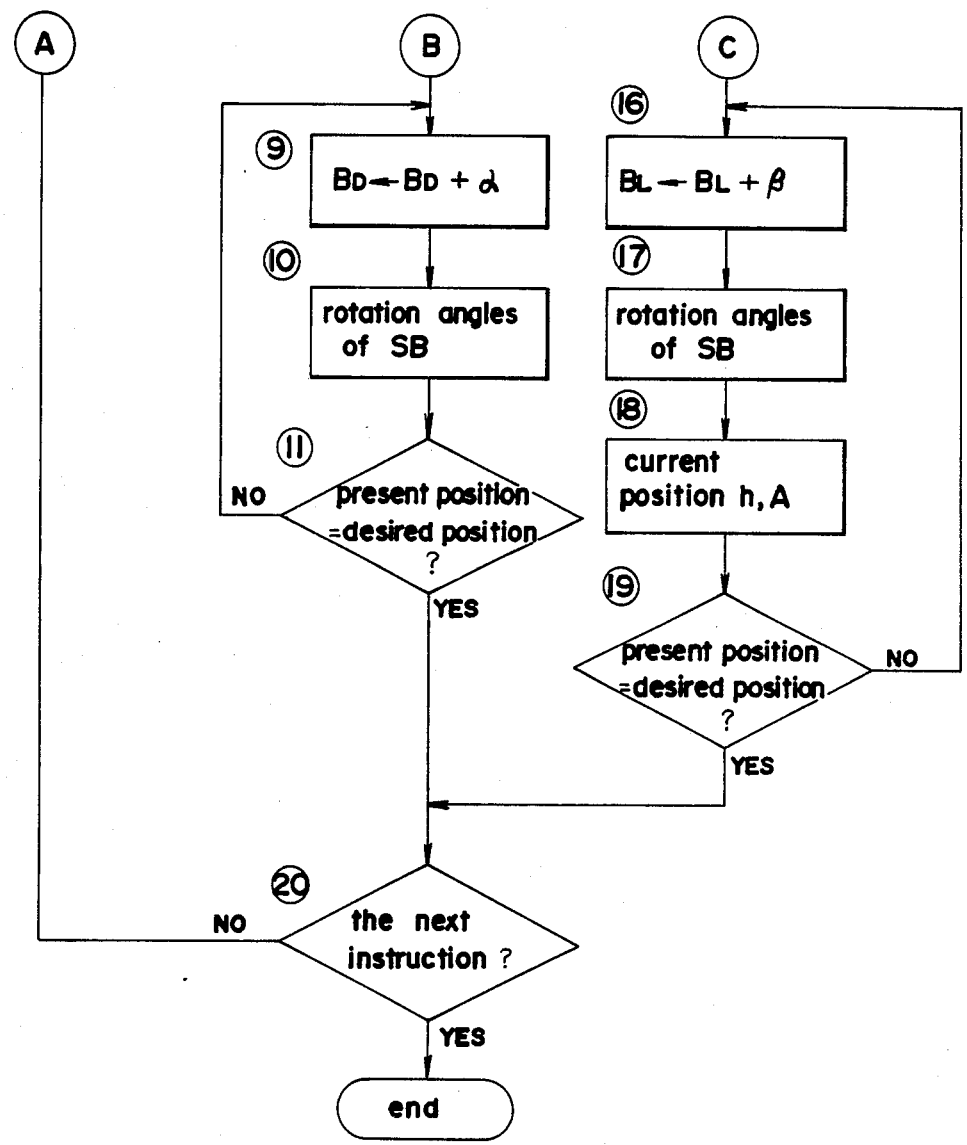
Figure 6:
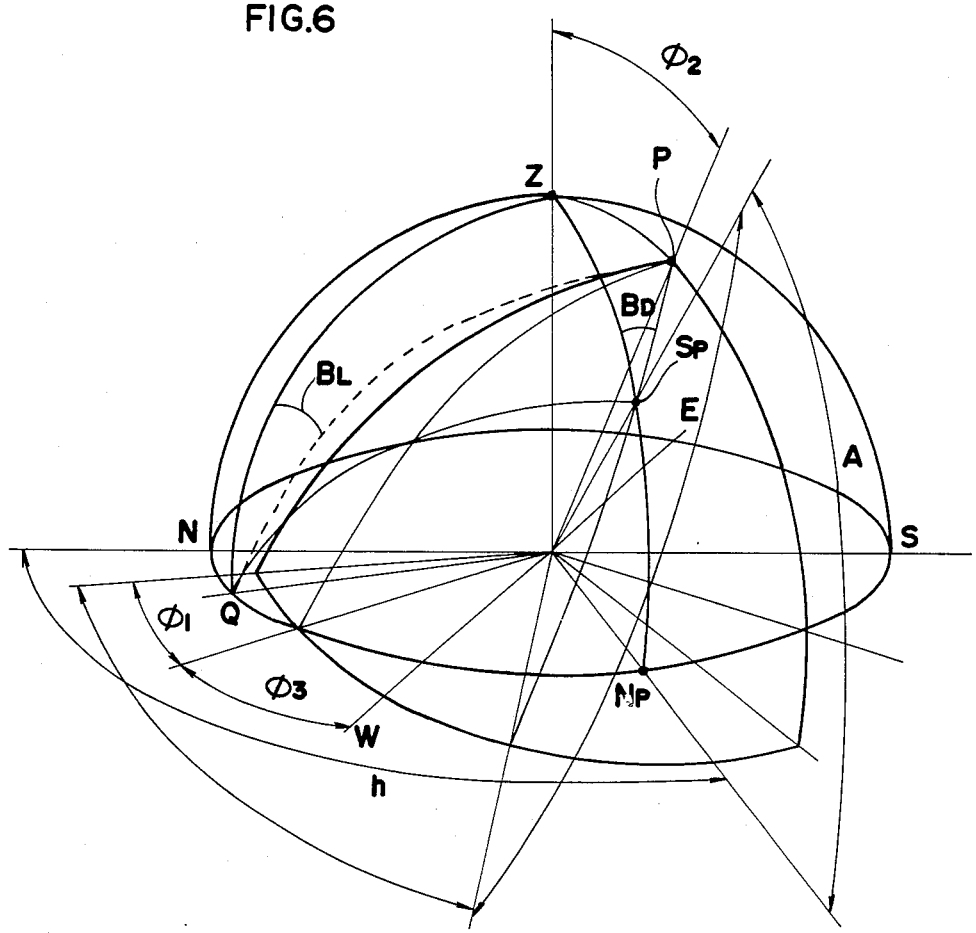

With reference to FIG. 5 and FIG. 6, the reference coordinates projection control which is effected with the aforesaid control circuit is explained below.

Namely, as shown in FIG. 5, a desired plant is designated (step 1), a horizontal system of coordinates (h, A) of the North Pole (Sp) is obtained by inputting the North Pole (Sp) which is the center of the diurnal motion of such planet, such coordinates (h, A) are matches withe the coordinates of the North pole by driving the motors (14), (21). Thereby, such coordinates system is converted to the coordinates system of the planet (step 2 and step 3).

The horizontal system of coordinates (h, A) in this case is defined by the horizontal bearings (h) of the North pole (Sp) of a planet and the horizontal altitude (A) of the North pole (Sp) of a planet as shown in FIG. 6. In FIG. 6, (Z) is the Zenith, (E), (W), (S) and (N) indicate the East, West, South and North on the dome of the planetarium, respectively. (P) is the North pole of the earth system of coordinates and $N_p$ is the North in the planet systm of coordinates. ($\phi_1$), ($\phi_2$) and ($\phi_3$) are the amounts of motion of the star field projector (1) about the first axis (I), second axis (II) and third axis (III). (Q) is the center of change of latitude, ($B_D$) is an auxiliary angle in the calculation of diurnal motion and ($B_L$) is an auxiliary angle in the calculation of latitude.

Next, the motion is ascertained as to whether it is is the diurnal motion (change in longitude) or not (step 4). In case of diurnal motion, the North pole (Sp) of the planet is input (step 5) and the angle between a current position and a desired position to be shifted are input (step 6) (change in longitude). In this case, when it is desired to observe the motions of stars at a half-day from the current position, it is sufficient to input the date of 180° (diurnal motion). With the input of such angle data, the star field projector (1) is rotated concurrently for the specified angle around the first, second and third axes (I) to (III) by the complementary method (steps 7 to 11).

In case it is not the diurnal motion, the operation moves to step 12 and successive steps for the latitude changing motion. Namely, the rotation center for latitude change motion of a pertinent planet is obtained (step 12). In more detail, (Sp) is the center of diurnal motion of the pertinent planet in FIG. 6 and the point (Np) where the line connecting (Sp) and the zenith (Z) crosses the horizon is the "North" of the pertinent planet. Therefore, the latitude change rotation axis connects the points which are separated by 90° respectively in the East and West from (Np) (only one point is indicated as (Q) in the figure). The coordinates (declination $Q_\alpha$ and right-ascension $Q_\delta$) of the equator of this (Q) can be obtained by calculating the spherical triangle of $\triangle ZPQ$.

Here, the desired latitude change rotating angle is input (step 13), a calculation interval ($\beta$) is input (step 14), a latitude calculation auxilliary angle ($B_L$) is obtained (step 15) and the calculation interval ($\beta$) is added to this ($B_L$) (step 16). The amounts of movement $\phi_1$, $\phi_2$, $\phi_3$ of star field projector (1) are calculated and the results are output to each motor (steps 16, 17). These operations are repeated until the current position (h, A) on moving coincides with the desired position (steps 18, 19).

The present invention contemplates the provision of any one coordinates projector (6), (7), (8), (9) of the meridian projector (6), pole projector (7), bearings projector (8) and direction projector (9).

The structure of the present invention can be effectively adapted to a planetarium providing an ecliptic pole as the fourth axis for precession of the Earth in order to simulate the solar system.

As explained above, the present invention provides the second rotating member which rotates independently about the rotating axis of the first rotating member in addition to the first rotating member being engaged with the star field projector and is thereby capable of projecting the reference coordinates such as direction, bearings, meridian and poles of not only the Earth but also of other planets, and the Sun and the Moon. Accordingly, the present invention makes it possible to easily understand the meanings of the motions of a celestial body irrespective of the position from which the celestial body is observed.

Although the present invention has been fully described by way of example with reference to the accompanying drawings, it is to be noted here that various changes and modifications will be apparent to those skilled in the art. Therefore, unless such changes and modifications depart from the scope of the present invention, they should be constructed as included therein.

What is claimed is:

1. A planetarium comprising;
    a star field projecting globe for projecting a star field,
    a supporting means for supporting said star field projecting globe rotatably about a first axis,
    a first rotating means for supporting said supporting means rotatably about a second axis which orthogonally crosses said first axis,
    auxiliary projecting means for projecting coordinates,
    a second rotating means for supporting said auxiliary projecting means, and
    a base means for supporting said first rotating means and said second rotating means for independent rotation about a third axis which orthogonally crosses said second axis.

2. A planetarium as claimed in claim 1 wherein said supporting means includes a ring-shaped member which supports the star field projecting globe at its one great circle.

3. A planetarium as claimed in claim 2 wherein said star field projecting globe is rotatable about the first axis which orthogonally intersections a plane continuing said great circle.

4. A planetarium as claimed in claim 1 wherein said auxiliary projecting means projects bearings.

5. A planetarium as claimed in claim 1 wherein said auxiliary projecting means projects meridians.

6. A planetarium as claimed in claim 1 wherein said auxiliary projecting means projects poles.

7. A planetarium as claimed in claim 1 wherein said auxiliary projecting means projects directions.

8. A planetarium comprising:
    a star field projector;
    a reference projector;
    a first mount supporting said star field projector for rotation about a first axis;
    a second mount supporting said first mount for rotation about a second axis orthogonal to said first axis;
    a third mount supporting said reference projector; and
    a base supporting said second and third mounts for relative independent rotation about a third axis orthogonal to said second axis.

9. The planetarium of claim 8 wherein said reference projector is a coordinates projector.

10. The planetarium of claim 8 including a plurality of reference projectors supported by said third mount.

11. The planetarium of claim 10 wherein said reference projectors include a bearings projector, a meridians projector, a poles projector and a directions projector.

* * * * *